US012668187B2

(12) United States Patent　　　(10) Patent No.:　US 12,668,187 B2

Kodama　　　　　　　　　　　　(45) Date of Patent:　Jun. 30, 2026

(54) DISPLAY DEVICE

(71) Applicant: TOYOTA JIDOSHA KABUSHIKI KAISHA, Aichi (JP)

(72) Inventor: Shinya Kodama, Nagoya (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/939,529

(22) Filed: Nov. 7, 2024

(65) Prior Publication Data

US 2025/0153642 A1　　May 15, 2025

(30) Foreign Application Priority Data

Nov. 13, 2023　(JP) ................................. 2023-193140

(51) Int. Cl.
　　*B60R 1/27*　　　　(2022.01)
　　*G06T 11/00*　　　(2006.01)
　　*H04N 7/18*　　　(2006.01)

(52) U.S. Cl.
　　CPC ............... B60R 1/27 (2022.01); G06T 11/00 (2013.01); H04N 7/181 (2013.01); *B60R 2300/303* (2013.01)

(58) Field of Classification Search
　　CPC ..... B60R 1/27; B60R 2300/303; G06T 11/00; H04N 7/181
　　USPC ....................................................... 348/148
　　See application file for complete search history.

(56) References Cited

U.S. PATENT DOCUMENTS 9,969,261 B2　5/2018　Kodama
10,045,173 B1　8/2018　Morimura et al.

10,106,157　B2　10/2018　Sawada et al.
10,150,407　B2　12/2018　Takahashi et al.
10,696,297　B2　6/2020　Nguyen Van et al.
11,001,255　B2　5/2021　Fukuman et al.
11,110,937　B2　9/2021　Kinoshita et al.
2010/0250052　A1*　9/2010　Ogino ....................... B60R 1/29
　　　　　　　　　　　　　　　　　　　348/148
2018/0093619　A1*　4/2018　Han .......................... B60R 1/31
2019/0001968　A1　1/2019　Yorifuji et al.
(Continued)

FOREIGN PATENT DOCUMENTS

JP　　　　2012-051391 A　　　3/2012

*Primary Examiner* — Joseph G Ustaris

*Assistant Examiner* — Jimmy S Lee

(74) *Attorney, Agent, or Firm* — HAUPTMAN HAM, LLP

(57)　　　　　　　ABSTRACT

A display device including: an image acquisition unit configured to acquire captured images using cameras that capture an image of surroundings of a vehicle; a composite image generation unit configured to synthesize the captured images and generate a composite vehicle image representing the vehicle as viewed from a virtual viewpoint; and a display control unit configured to display the composite vehicle image on an in-vehicle display unit. The composite image generation unit generates the composite vehicle image based on a direction relative to the vehicle from the virtual viewpoint to represent a door of the vehicle as being more widely opened when the virtual viewpoint is located in a predetermined first direction than when the virtual viewpoint is located in a predetermined second direction, the second direction being a direction from which an opening area of the door is more visible from the virtual viewpoint than from the first direction.

15 Claims, 6 Drawing Sheets

(56) References Cited

U.S. PATENT DOCUMENTS

| 2019/0308562 A1 * | 10/2019 | Yamada .................. B60R 11/04 |
|---|---|---|
| 2019/0344828 A1 | 11/2019 | Omori et al. |
| 2019/0389488 A1 | 12/2019 | Yamada et al. |

* cited by examiner

DISPLAY DEVICE

CROSS-REFERENCE TO RELATED APPLICATION

This application is based upon and claims the benefit of priority from Japanese Patent Application No. 2023-193140, filed on Nov. 13, 2023, the entire contents of which are incorporated herein by reference.

TECHNICAL FIELD

The present disclosure relates to a display device.

BACKGROUND

Conventionally, an image processing device is known that generates a composite image showing a vehicle from a virtual viewpoint based on captured images taken by multiple cameras around the vehicle, draws the opening and closing trajectory of a vehicle's door on the vehicle image included in the composite image, and outputs and displays the composite image on a display (for example, Japanese Patent Application Laid-Open No. 2012-051391).

SUMMARY

It has been considered to display a composite vehicle image representing the vehicle as viewed from a virtual viewpoint on an in-vehicle display unit. In such a composite vehicle image, even if an actual degree of door opening of the vehicle is the same, a degree of door opening as viewed from the virtual viewpoint may appear different. As a result, depending on the direction of the virtual viewpoint relative to the vehicle, it may be difficult to recognize the degree of door opening in the composite vehicle image displayed on the display unit.

An example of the present disclosure is a display device includes an image acquisition unit configured to acquire captured images using a plurality of cameras that capture an image of surroundings of a vehicle, a composite image generation unit configured to synthesize the captured images and generate a composite vehicle image representing the vehicle as viewed from a virtual viewpoint, and a display control unit configured to display the composite vehicle image on an in-vehicle display unit. The composite image generation unit generates the composite vehicle image based on a direction relative to the vehicle from the virtual viewpoint to represent a door of the vehicle as being more widely opened when the virtual viewpoint is located in a predetermined first direction than when the virtual viewpoint is located in a predetermined second direction, the second direction being a direction from which an opening area of the door is more visible from the virtual viewpoint than from the first direction.

According to the example display device of the present disclosure, multiple captured images obtained using multiple cameras are synthesized to generate a composite vehicle image representing the vehicle as viewed from the virtual viewpoint. The generated composite vehicle image is displayed on the in-vehicle display unit. When the virtual viewpoint is located in the predetermined first direction, the composite vehicle image is generated to represent the door as being more widely opened compared to when the virtual viewpoint is located in the predetermined second direction. Therefore, in the composite vehicle image viewed from the virtual viewpoint located in the first direction, the open door becomes more easily seen. Thus, according to the example display device of the present disclosure, it becomes easier to recognize the degree of door opening in the composite vehicle image displayed on the display unit.

In some examples, the door of the vehicle may include a hinged door that opens by rotating around a hinge fixed to a body of the vehicle, the first direction may be a direction not facing an opening area of the hinged door, the second direction may be a direction facing the opening area of the hinged door, and the composite image generation unit may generate the composite vehicle image to represent the hinged door as being opened with a larger rotation amount when the virtual viewpoint is located in the first direction than the rotation amount when the virtual viewpoint is located in the second direction.

In some examples, the door of the vehicle may include a sliding door that opens by moving in a vehicle width direction with a predetermined shift amount and moving in a longitudinal direction relative to a body of the vehicle, the first direction may be a direction not facing an opening area of the sliding door, the second direction may be a direction facing the opening area of the sliding door, and the composite image generation unit may generate the composite vehicle image to represent the sliding door as being moved in the vehicle width direction with a larger shift amount when the virtual viewpoint is located in the first direction than the shift amount when the virtual viewpoint is located in the second direction.

According to examples of the present disclosure, it becomes easier to recognize the degree of door opening in the composite vehicle image displayed on the display unit.

DETAILED DESCRIPTION

Hereinafter, an example of the present disclosure will be described with reference to the drawings.

Figure 1:
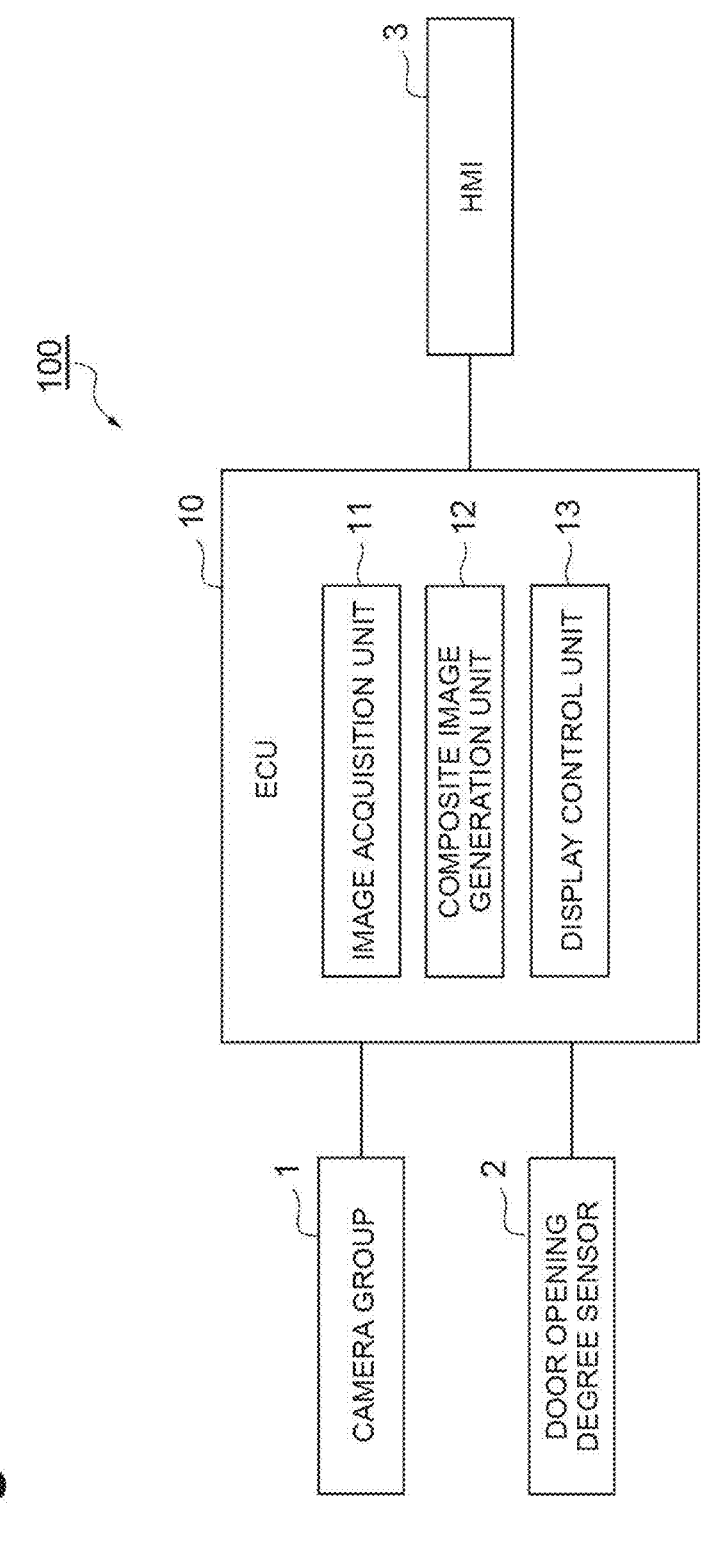
FIG. 1 is a block diagram showing a display device according to an example of the present disclosure.

FIG. 1 is a block diagram showing a display device according to an example of the present disclosure. As shown in FIG. 1, a display device 100 is mounted on a vehicle such as a passenger car. The display device 100 is a device for displaying a composite vehicle image (3D view) representing the vehicle as viewed from a virtual viewpoint on a display unit such as an in-vehicle display. Note that some functions of the display device 100 may be executed on a server that can communicate with the vehicle. The door of the vehicle includes a hinged door that opens by rotating around a hinge fixed to the body of the vehicle.

[Configuration of Display Device]

The configuration of the display device 100 according to the present example will be described with reference to FIG. 1. As shown in FIG. 1, the display device 100 includes an ECU (Electronic Control Unit) 10.

The ECU 10 is an electronic control unit having a CPU (Central Processing Unit) and a storage unit. The storage unit includes, for example, a ROM (Read Only Memory), a RAM (Random Access Memory), and an EEPROM (Electrically Erasable Programmable Read-Only Memory). The ECU 10 realizes various functions by executing programs stored in the storage unit with the CPU. The ECU 10 may be composed of multiple electronic units.

The ECU 10 is connected to a camera group 1, a door opening degree sensor 2, and an HMI (Human Machine Interface) 3.

The camera group 1 is a plurality of cameras that capture images of the surroundings of the vehicle. The camera group 1 includes, for example, a front camera, a rear camera, and a pair of left and right side view cameras. The front camera is provided, for example, on the front bumper of the vehicle and captures images of the surroundings in front of the vehicle. The rear camera is provided, for example, on the rear bumper of the vehicle and captures images of the surroundings behind the vehicle. The side view cameras are provided, for example, near the door mirrors of the vehicle and capture images of the surroundings on the sides of the vehicle. The camera group 1 may have a wide-angle field of view and may also capture the vehicle body. The camera group 1 transmits captured images of the surroundings of the vehicle to the ECU 10.

The door opening degree sensor 2 is a detection device that detects the opening degree of the door of the vehicle. The door opening degree sensor 2 may be a linear sensor that detects the opening degree of the door of the vehicle. When the door is a hinged door, the linear sensor may detect the rotation amount or the angle of the hinged door. When the door is a sliding door, the linear sensor may detect the shift amount, which is the amount of movement of the sliding door in the vehicle width direction. The door opening degree sensor 2 transmits information about the opening degree or opening/closing of the door to the ECU 10.

The HMI 3 is an interface for inputting and outputting information between the ECU 10 and the occupant. The HMI 3 includes, for example, a display, a speaker, and a microphone provided in the vehicle interior. The HMI 3 outputs images on the display and outputs sound from the speaker in response to control signals from the ECU 10. The display may function as a touch panel. The display may be a center display, a navigation display, or a HUD (Head Up Display). The HUD presents information to the occupant by projecting images onto the windshield of the vehicle.

The HMI 3 accepts an operation by the occupant to select the virtual viewpoint. The operation to select the virtual viewpoint may be, for example, a touch operation on an image corresponding to the virtual viewpoint displayed on the touch panel, or an input operation of a value of a direction (angle) relative to the vehicle corresponding to the virtual viewpoint. The HMI 3 displays the generated composite vehicle image to the occupant.

Next, the functional configuration of the ECU 10 will be described. The ECU 10 includes an image acquisition unit 11, a composite image generation unit 12, and a display control unit 13.

The image acquisition unit 11 acquires captured images using a plurality of cameras that capture images of the surroundings of the vehicle. The image acquisition unit 11 acquires captured images taken by the camera group 1.

The composite image generation unit 12 synthesizes the captured images and generates a composite vehicle image representing the vehicle as viewed from a virtual viewpoint. The composite image generation unit 12 generates a composite vehicle image representing the surroundings of the vehicle including the vehicle as viewed from an optional virtual viewpoint, based on the captured images taken by the camera group 1. The composite image generation unit 12 generates the composite vehicle image as viewed from the virtual viewpoint by combining the captured images taken by the camera group 1 using a known method, excluding the degree of door opening.

The composite image generation unit 12 generates the composite vehicle image based on a direction relative to the vehicle from the virtual viewpoint to represent a door of the vehicle as being more widely opened when the virtual viewpoint is located in a predetermined first direction than when the virtual viewpoint is located in a predetermined second direction. The first direction is a predetermined direction in which it is difficult to recognize the degree of door opening of the vehicle compared to the second direction. The second direction is a predetermined direction in which the opening area of the door of the vehicle is more visible from the virtual viewpoint than the first direction. The second direction may be a predetermined direction in which the opening area of the door of the vehicle is more easily seen from the virtual viewpoint than the first direction.

Figures 2A, 2B, 2C:
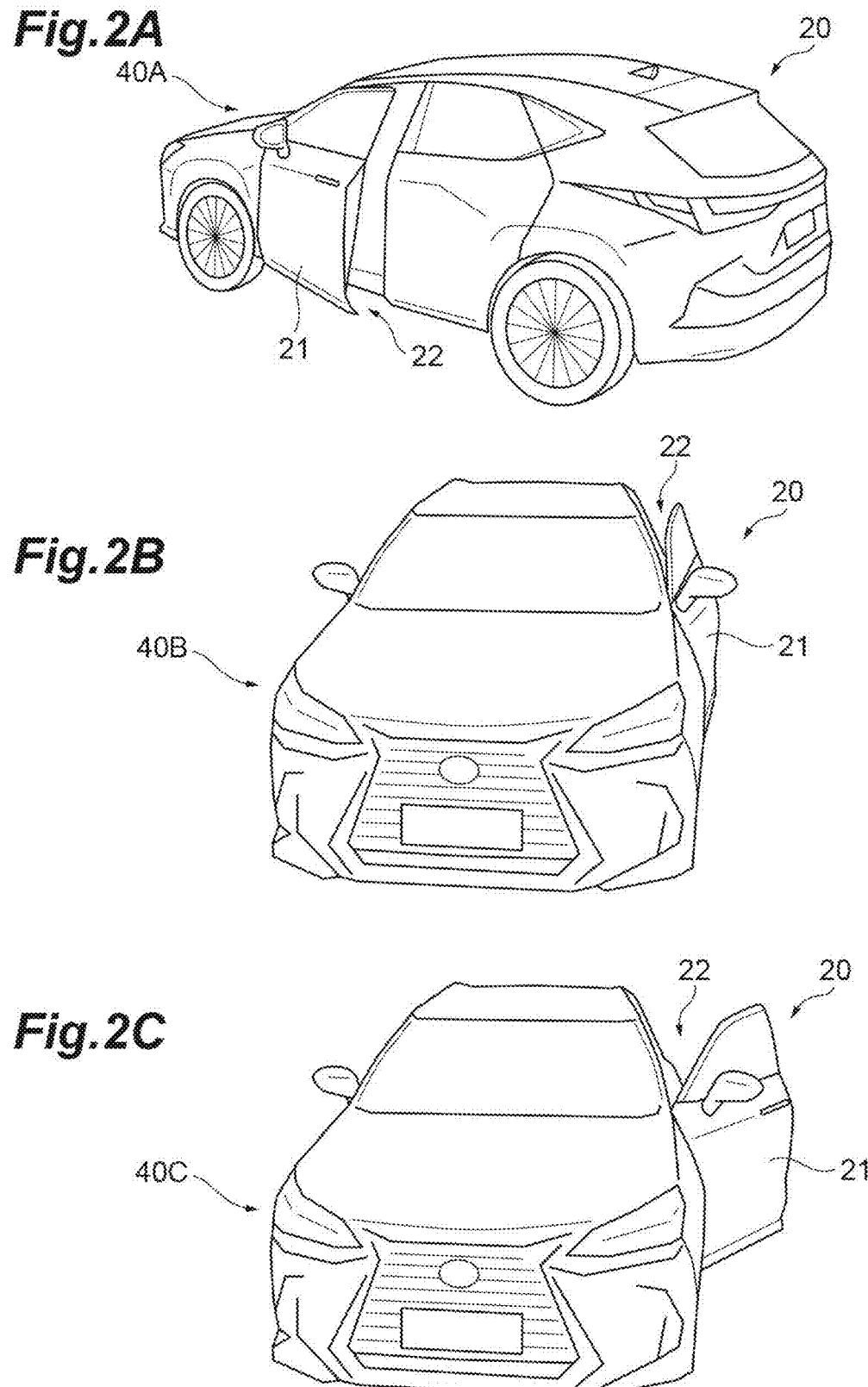
FIG. 2A is an example of a composite vehicle image of a hinged door opened at a door opening degree corresponding to an actual door opening degree of the vehicle when the virtual viewpoint is located in the second direction.
FIG. 2B is an example of a composite vehicle image of a hinged door opened at a door opening degree corresponding to an actual door opening degree of the vehicle when the virtual viewpoint is located in the first direction.
FIG. 2C is an example of a composite vehicle image representing a hinged door opened wider when the virtual viewpoint is located in the first direction compared to when it is located in the second direction.

FIG. 2A is an example of a composite vehicle image of a hinged door opened at a door opening degree corresponding to an actual door opening degree of the vehicle when the virtual viewpoint is located in the second direction. FIG. 2B is an example of a composite vehicle image of a hinged door opened at a door opening degree corresponding to an actual door opening degree of the vehicle when the virtual viewpoint is located in the first direction. FIG. 2C is an example of a composite vehicle image representing a hinged door opened wider when the virtual viewpoint is located in the first direction compared to when the virtual viewpoint is located in the second direction.

FIG. 2A shows a composite vehicle image 40A of a hinged door 21 of the vehicle 20 being opened, as viewed from a viewpoint diagonally behind the left side of the vehicle 20. The viewpoint in FIG. 2A faces the opening area 22 of the hinged door 21. From the viewpoint in FIG. 2A, the opening area 22 of the hinged door 21 can be easily seen. Therefore, even if the composite vehicle image 40A is generated and displayed on the HMI 3 with the door opening degree same as the actual door opening degree, the occupant of the vehicle 20 can easily recognize the degree of door opening of the vehicle 20 in the composite vehicle image 40A displayed on the HMI 3.

FIG. 2B shows a composite vehicle image 40B of the hinged door 21 of the vehicle 20 being opened to the same degree as in FIG. 2A, as viewed from a viewpoint in front of the vehicle 20. The viewpoint in FIG. 2B does not face the opening area 22 of the hinged door 21. From the viewpoint in FIG. 2B, it is difficult to see the opening area 22 of the hinged door 21. Due to such a difference in visibility, even though the hinged door 21 of the vehicle 20 is opened to the same degree as in FIG. 2A, the door opening degree of the hinged door 21 may appear smaller in FIG. 2B compared to FIG. 2A. Thus, if the composite vehicle image 40B is generated and displayed on the HMI 3 with the same degree of door opening as in FIG. 2A, the occupant of the vehicle 20 may find it difficult to recognize the degree of door opening of the vehicle 20 in the composite vehicle image 40B displayed on the HMI 3.

Therefore, the composite image generation unit 12 generates a composite vehicle image 40C to represent the hinged door 21 as being opened with a larger rotation amount when the virtual viewpoint is located in the first direction than when the virtual viewpoint is located in the second direction. Here, the first direction is a direction not facing the opening area 22 of the hinged door 21, and the second direction is a direction facing the opening area 22 of the hinged door 21.

FIG. 2C shows the composite vehicle image 40C of the hinged door 21 of the vehicle 20 being actually opened to the same degree as in FIG. 2A, but with a larger door opening degree than in FIG. 2A, as viewed from a viewpoint in front of the vehicle 20. This makes it easier to see that the hinged door of the vehicle 20 is open. The degree of door opening for generating the composite vehicle image 40C with a larger opening degree than the actual door opening degree can be determined using a preset relationship between the visibility of the opening area 22 of the door of the vehicle 20 and the direction relative to the vehicle 20, as an example.

Figure 3:
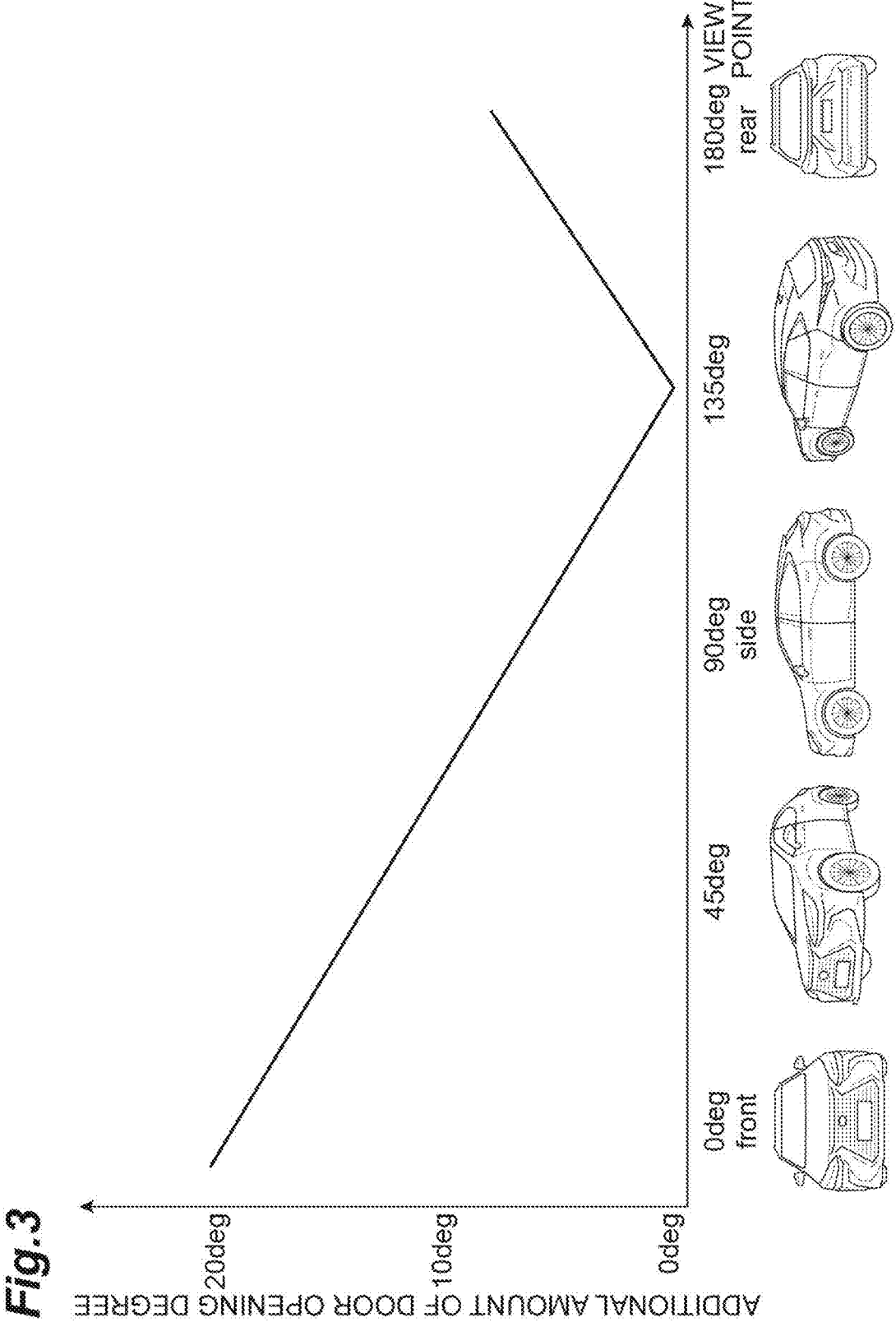
FIG. 3 is a diagram illustrating a tendency of visibility of the door opening area of the vehicle.

FIG. 3 is a diagram illustrating a tendency of visibility of the door opening area of the vehicle. As shown in FIG. 2A, FIG. 2B, FIG. 2C and FIG. 3, the tendency of visibility of the opening area 22 of the door of the vehicle 20 when the door is a hinged door 21 may be as shown in FIG. 3, for example. In the example of FIG. 3, as the direction relative to the vehicle 20, for example, for the viewpoint located on the left side of the vehicle 20, the front of the vehicle 20 is defined as 0 degrees and the rear of the vehicle 20 is defined as 180 degrees, with viewpoints defined every 45 degrees. In the case of the vehicle 20 in FIG. 3, the opening area 22 of the door of the vehicle 20 is most visible from a viewpoint diagonally behind the left side of the vehicle 20 (135 degrees direction), and becomes less visible in the order of 90 degrees and 45 degrees, and is least visible from a viewpoint directly in front of the vehicle 20 (0 degrees direction), regarding the viewpoints located on the left side of the vehicle 20.

Although not shown in FIG. 3, it is also possible to assume a viewpoint located on the right side of the vehicle 20, with 180 degrees at the rear of the vehicle 20 and 360 degrees at the front of the vehicle 20. The visibility of the opening area 22 of the door of the vehicle 20 may be symmetrical between the viewpoint located on the left side of the vehicle 20 and the viewpoint located on the right side of the vehicle 20. In this case, specifically, the opening area 22 of the door of the vehicle 20 is the easiest to be seen (most visible) from a viewpoint diagonally behind the left side of the vehicle 20 (135 degrees direction), becomes more difficult to be seen (less visible) from a viewpoint directly behind the vehicle 20 (180 degrees direction), and becomes the easiest to be seen (most visible) again from a viewpoint diagonally behind the right side of the vehicle 20 (225 degrees direction). The opening area 22 of the door of the vehicle 20 becomes more difficult to be seen (less visible) in the order of 270 degrees and 315 degrees, and is least visible from a viewpoint directly in front of the vehicle 20 (360 degrees direction).

In FIG. 3, the additional amount of door opening degree is defined every 45 degrees from 0 degrees to 180 degrees. The additional amount of door opening degree is a correction amount of the door opening degree on the composite vehicle image, which is preset according to the visibility (or difficulty of visibility) of the opening area 22 of the door of the vehicle 20. The additional amount of door opening degree is smaller for viewpoints where the opening area 22 of the door of the vehicle 20 is more visible, and larger for viewpoints where the opening area 22 of the door of the vehicle 20 is less visible. The additional amount of door opening degree may monotonically increase according to the direction relative to the vehicle 20 from the viewpoint where the opening area 22 of the door of the vehicle 20 is most visible to the viewpoint where it is least visible. In calculating the additional amount of door opening degree, the value of the additional amount of door opening degree may be determined in response to determining or selecting the virtual viewpoint.

Note that the first direction and the second direction do not need to be predetermined as to which angle range they fall within relative to the vehicle. The first direction and the second direction may be directions for relatively comparing the visibility of the opening area of the door of the vehicle at arbitrary two virtual viewpoints. For example, when the first direction is 90 degrees direction, the second direction may be 135 degrees direction. When the first direction is 45 degrees direction, the second direction may be 90 degrees direction.

Figure 4A:
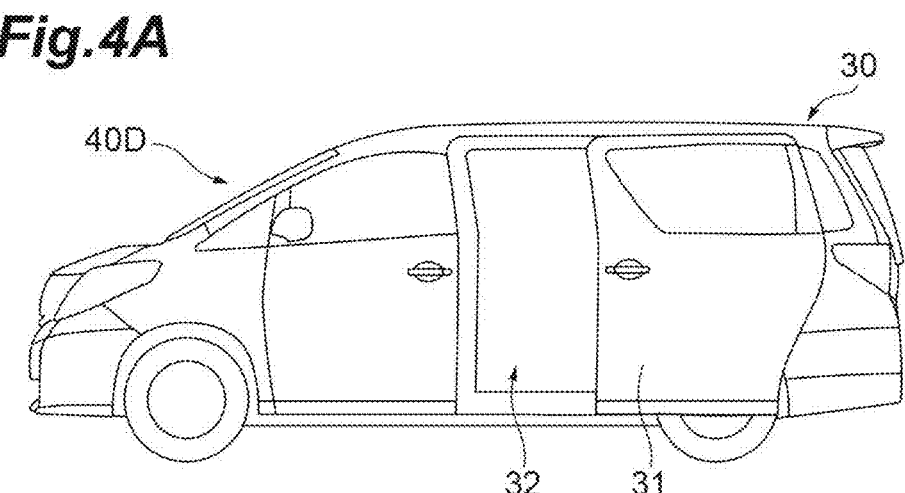
FIG. 4A is a side view illustrating a sliding door opened at a door opening degree corresponding to an actual door opening degree of the vehicle.
Figure 4B:
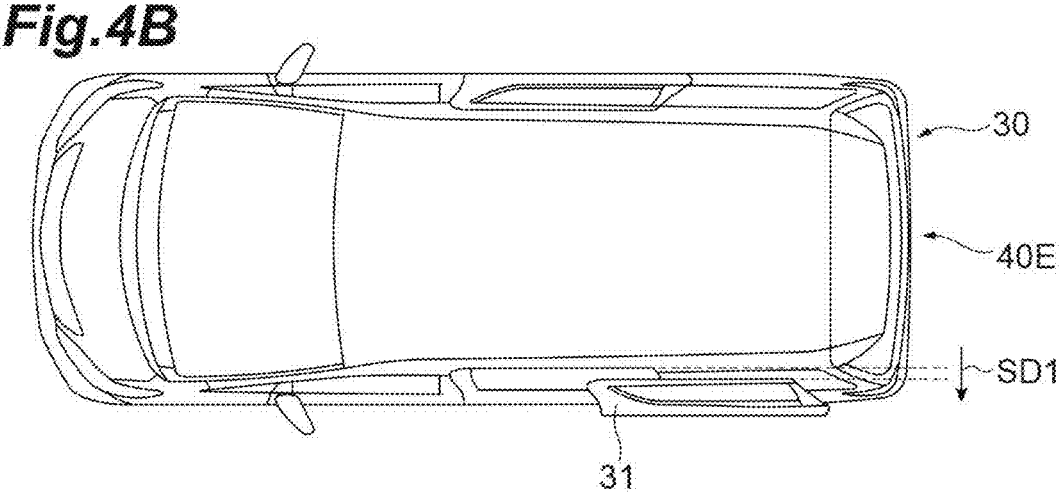
FIG. 4B is a plan view illustrating a sliding door opened at a door opening degree corresponding to an actual door opening degree of the vehicle.
Figure 4C:
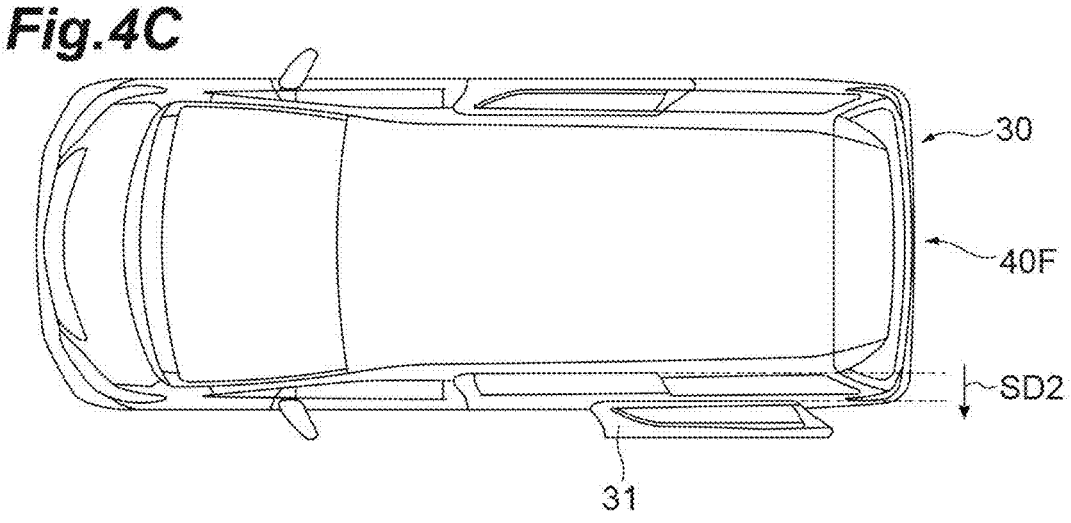
FIG. 4C is a plan view illustrating a sliding door opened wider than the actual door opening degree corresponding to the door opening of the vehicle.

The door of the vehicle may include a sliding door 31 that opens by moving in the vehicle width direction with a predetermined shift amount and moving in the longitudinal direction relative to the body of the vehicle 30. FIG. 4A is a side view illustrating a sliding door opened at a door opening degree corresponding to an actual door opening degree of the vehicle. FIG. 4B is a plan view illustrating a sliding door opened at a door opening degree corresponding to an actual door opening degree of the vehicle. FIG. 4C is a plan view illustrating a sliding door opened wider than the actual door opening degree corresponding to the door opening of the vehicle.

FIG. 4A shows a composite vehicle image 40D of the sliding door 31 of the vehicle 30 being opened, as viewed from a viewpoint on the left side of the vehicle 30. The viewpoint in FIG. 4A faces the opening area 32 of the sliding door 31. From the viewpoint in FIG. 4A, the opening area 32 of the sliding door 31 can be easily seen. Therefore, even if the composite vehicle image 40D is generated and displayed on the HMI 3 with the door opening degree same as the actual door opening degree, the occupant of the vehicle 30 can easily recognize the degree of door opening of the vehicle 30 in the composite vehicle image 40D displayed on the HMI 3.

FIG. 4B shows a composite vehicle image 40E of the sliding door 31 of the vehicle 30 being opened to the same degree as in FIG. 4A, as viewed from a viewpoint above the vehicle 30 for convenience of explanation. The viewpoint in FIG. 4B does not face the opening area 32 of the sliding door 31. From the viewpoint in FIG. 4B, it is difficult to see the opening area 32 of the sliding door 31. Due to such a difference in visibility, even though the sliding door 31 of the vehicle 30 is opened to the same degree as in FIG. 4A, it is more difficult to recognize that the sliding door 31 is open in FIG. 4B compared to FIG. 4A. Specifically, the composite vehicle image 40E shows the state where the sliding door 31 has moved by a predetermined shift amount SD1 in the vehicle width direction relative to the body of the vehicle 30, but since the viewpoint in FIG. 4B does not face the opening area 32 of the sliding door 31, it is difficult to recognize that the sliding door 31 is open compared to FIG. 4A. Thus, if the composite vehicle image 40E is generated and displayed on the HMI 3 with the same degree of door opening as in FIG. 4A, the occupant of the vehicle 30 may find it difficult to recognize the degree of door opening of the vehicle 30 in the composite vehicle image 40E displayed on the HMI 3.

Therefore, the composite image generation unit 12 generates the composite vehicle image 40F to represent the sliding door 31 as being moved in the vehicle width direction with a larger shift amount when the virtual viewpoint is located in the first direction than when the virtual viewpoint is located in the second direction. Here, the first direction is a direction not facing the opening area 32 of the sliding door 31, and the second direction is a direction facing the opening area 32 of the sliding door 31.

FIG. 4C shows a composite vehicle image 40F of the sliding door 31 of the vehicle 30 being actually opened to the same degree as in FIG. 4A, but shown with a larger door opening degree than in FIG. 4A, as viewed from a viewpoint above the vehicle 30 for convenience of explanation. The composite vehicle image 40F shows the state where the sliding door 31 has moved by a predetermined shift amount SD2 in the vehicle width direction relative to the body of the vehicle 30. By setting the shift amount SD2 larger than the shift amount SD1 used when the virtual viewpoint is located in the second direction, it becomes easier to recognize that the sliding door 31 of the vehicle 30 is open.

The display control unit 13 displays the composite vehicle image on the in-vehicle display of the HMI 3. The display control unit 13 displays the generated composite vehicle image as a 3D view on the display of the HMI 3.

[Operation of the Display Device]

Figure 5:
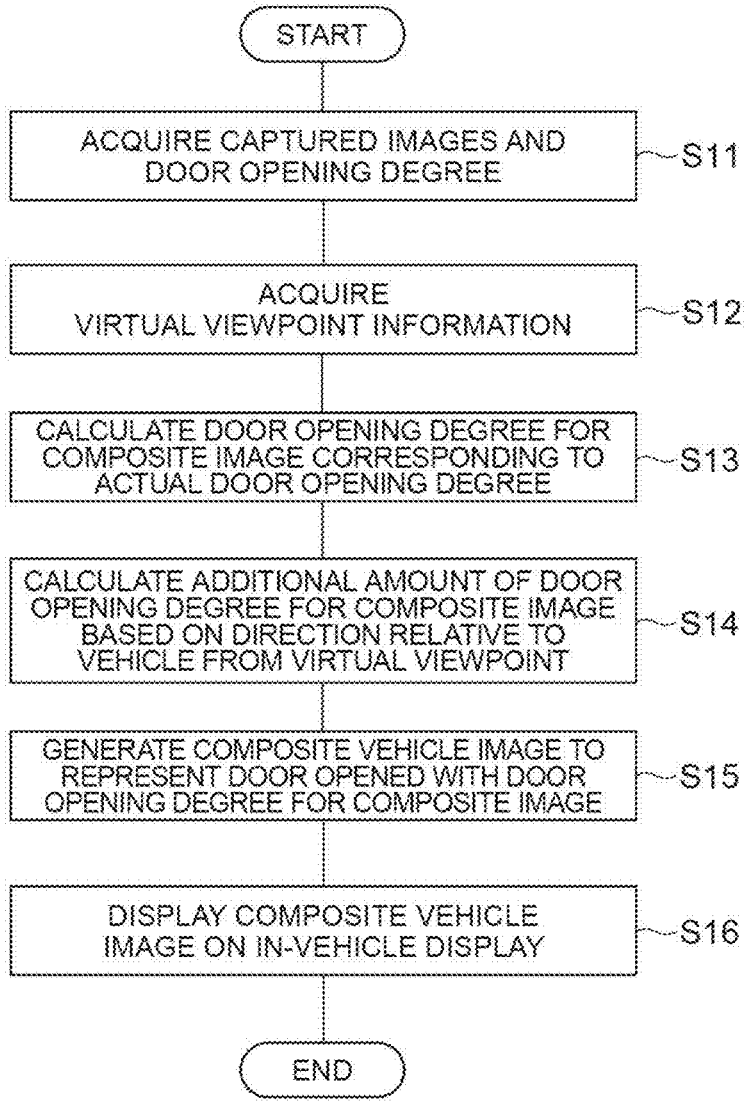
FIG. 5 is a flowchart showing an example of processing performed by the ECU of FIG. 1.

Next, the operation of the display device 100 will be described with reference to the drawings. FIG. 5 is a flowchart showing an example of processing performed by the ECU of FIG. 1. The processing of the ECU 10 in FIG. 5 is executed, for example, when the drawing of the composite vehicle image is requested while the vehicle is stopped with the door open.

As shown in FIG. 5, the ECU 10 of the display device 100 acquires captured images of the plurality of cameras by the image acquisition unit 11 in step S11. The image acquisition unit 11 acquires captured images taken by the camera group 1 that captures images of the surroundings of the vehicle. In step S11, the ECU 10 acquires the door opening degree using the composite image generation unit 12. The composite image generation unit 12 acquires the door opening degree based on the detection result of the door opening degree sensor 2.

In step S12, the ECU 10 acquires the virtual viewpoint using the composite image generation unit 12. The composite image generation unit 12 acquires the virtual viewpoint, for example, in response to an operation by the occupant to select the virtual viewpoint performed on the HMI 3.

In step S13, the ECU 10 calculates the door opening degree for the composite image corresponding to the actual door opening degree of the vehicle using the composite image generation unit 12. The composite image generation unit 12 calculates the door opening degree for generating the composite image to be equal to the acquired door opening degree, for example.

In step S14, the ECU 10 calculates the additional amount of door opening degree for the composite image based on the direction relative to the vehicle from the virtual viewpoint using the composite image generation unit 12. The composite image generation unit 12 acquires a preset additional amount of door opening degree according to the direction of the virtual viewpoint relative to the vehicle, for example, and calculates the additional amount of door opening degree for the composite image. The additional amount of door opening degree is smaller for viewpoints where the opening area of the door of the vehicle is more easily seen (more visible), and larger for viewpoints where the opening area of the door of the vehicle is less easily seen (less visible).

In step S15, the ECU 10 generates the composite vehicle image to represent the door opened with the door opening degree for the composite image using the composite image generation unit 12. The composite image generation unit 12 generates the composite vehicle image to represent the door opened with the door opening degree for the composite image by adding the additional amount of door opening degree to the door opening degree, so as to represent the door opened with the added door opening degree, for example. At this time, the additional amount of door opening degree is smaller for viewpoints where the opening area of the door of the vehicle is more visible, and larger for viewpoints where the opening area of the door of the vehicle is less visible. Therefore, the composite vehicle image is generated to represent the door opened wider when the virtual viewpoint is located in the first direction than when the virtual viewpoint is located in the second direction.

In step S16, the ECU 10 displays the composite vehicle image on the in-vehicle display using the display control unit 13. The display control unit 13 displays the composite vehicle image on the display of the HMI 3, for example. Thereafter, the ECU 10 ends the current processing of FIG. 5.

Note that the first direction and the second direction may be predetermined as to which angle range they fall within relative to the vehicle. For example, for a viewpoint located on the left side of the vehicle, the first direction may be predetermined as a direction of 0 degrees or more and less than 45 degrees not facing the opening area of the hinged door. For example, for a viewpoint located on the left side of the vehicle, the second direction may be predetermined as a direction of 45 degrees or more and 180 degrees or less facing the opening area of the hinged door. In this case, the ECU 10 can execute the processing as shown in FIG. 6.

Figure 6:
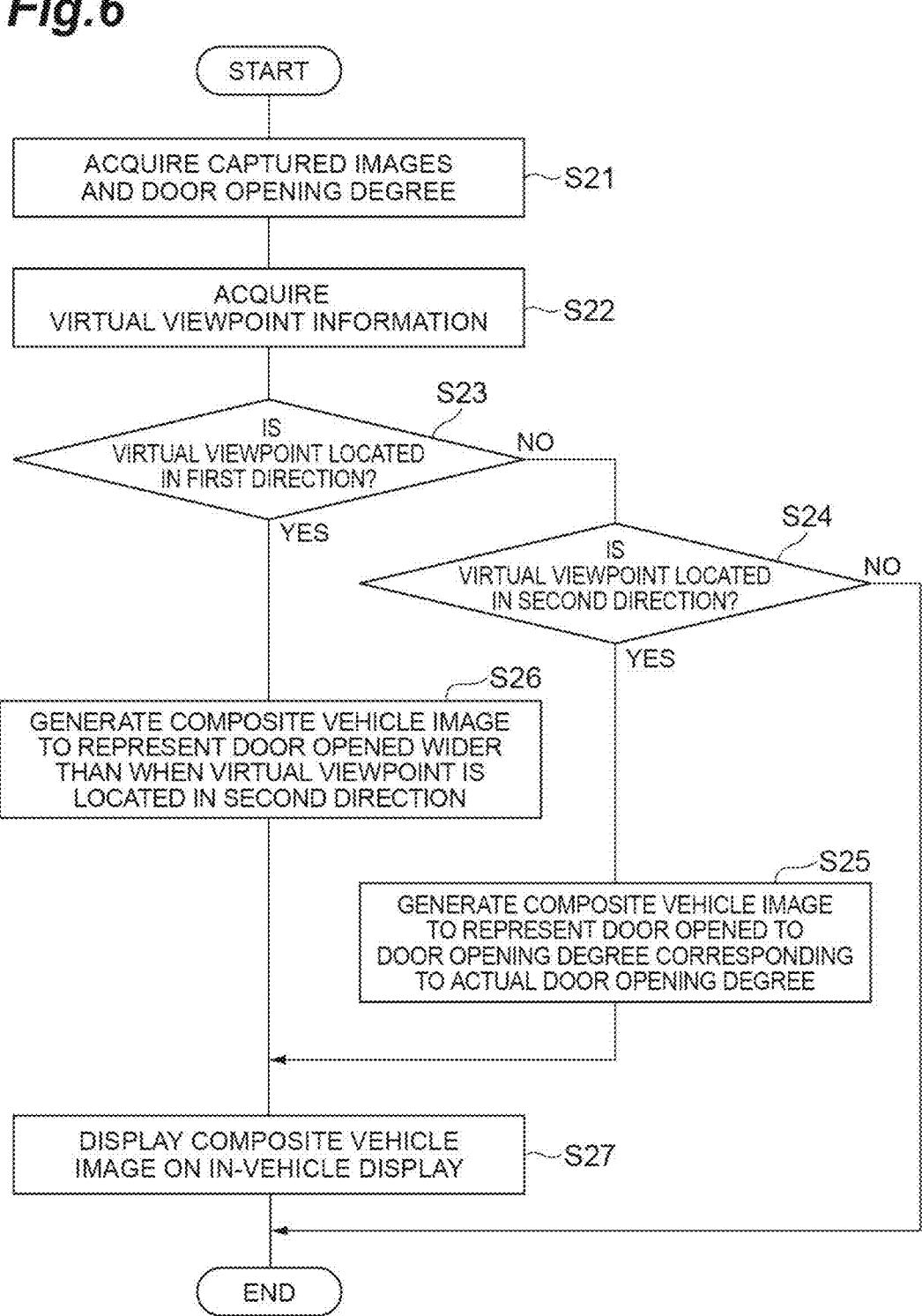
FIG. 6 is a flowchart showing another example of processing performed by the ECU of FIG. 1.

FIG. 6 is a flowchart showing another example of processing performed by the ECU of FIG. 1. The processing of the ECU 10 in FIG. 6 is executed, like in FIG. 5, when the drawing of the composite vehicle image is requested while the vehicle is stopped with the door open.

As shown in FIG. 6, the ECU 10 acquires captured images of the plurality of cameras using the image acquisition unit 11 in step S21, similar to step S11. The ECU 10 acquires the door opening degree using the composite image generation unit 12. In step S22, the ECU 10 acquires the virtual viewpoint using the composite image generation unit 12, similar to step S12.

In step S23, the ECU 10 determines whether the virtual viewpoint is located in the first direction using the composite image generation unit 12. If it is determined by the composite image generation unit 12 that the virtual viewpoint is located in the first direction (S23: YES), the ECU 10 proceeds to step S26. If it is determined by the composite image generation unit 12 that the virtual viewpoint is not located in the first direction (S23: NO), the ECU 10 proceeds to step S24.

In step S24, the ECU 10 determines whether the virtual viewpoint is located in the second direction using the composite image generation unit 12. If it is determined by the composite image generation unit 12 that the virtual viewpoint is located in the second direction (S24: YES), the ECU 10 proceeds to step S25. If it is determined by the composite image generation unit 12 that the virtual viewpoint is not located in the second direction (S24: NO), the ECU 10 ends the current processing of FIG. 6.

In step S25, the ECU 10 generates the composite vehicle image to represent the door opened with the door opening degree corresponding to the actual door opening degree using the composite image generation unit 12. The composite image generation unit 12 calculates the door opening degree for the composite image to be equal to the door opening degree, and generates the composite vehicle image to represent the door opened with the door opening degree equal to the door opening degree without adding the additional amount of door opening degree, for example.

On the other hand, in step S26, the ECU 10, using the composite image generation unit 12, generates the composite vehicle image to represent the door opened wider than when the virtual viewpoint is located in the second direction. The composite image generation unit 12 generates the composite vehicle image to represent the door opened with a door opening degree larger than the door opening degree by adding the additional amount of door opening degree to the door opening degree, for example.

In step S27, the ECU 10 displays the composite vehicle image on the in-vehicle display using the display control unit 13. The display control unit 13 displays the composite vehicle image on the display of the HMI 3, for example. Thereafter, the ECU 10 ends the current processing of FIG. 6.

As described above, according to the display device 100, multiple captured images obtained using the camera group 1 are synthesized by the composite image generation unit 12 to generate the composite vehicle images 40C, 40F representing the vehicle as viewed from the virtual viewpoint. The generated composite vehicle images 40C, 40F are displayed on the in-vehicle HMI 3. When the virtual viewpoint is located in the predetermined first direction, the composite vehicle images 40C, 40F are generated to represent the door opened wider than when the virtual viewpoint is located in the predetermined second direction. Therefore, in the composite vehicle images 40C, 40F viewed from the virtual viewpoint located in the first direction, the open door becomes more easily seen. Thus, according to the display device 100, it becomes easier for the occupant to recognize the degree of door opening in the composite vehicle images 40C, 40F displayed on the HMI 3.

The door of the vehicle includes a hinged door 21 that opens by rotating around a hinge fixed to the body of the vehicle 20. The first direction is a direction not facing the opening area 22 of the hinged door 21, and the second direction is a direction facing the opening area 22 of the hinged door 21. The composite image generation unit 12 generates the composite vehicle image 40C to represent the hinged door 21 as being opened with a larger rotation amount when the virtual viewpoint is located in the first direction than when the virtual viewpoint is located in the second direction. In this case, it becomes easier to recognize the degree of door opening of the hinged door 21 of the vehicle 20 in the composite vehicle image 40C displayed on the HMI 3.

The door of the vehicle includes a sliding door 31 that opens by moving in the vehicle width direction with a predetermined shift amount SD1 and moving in the longitudinal direction relative to the body of the vehicle 30. The first direction is a direction not facing the opening area 32 of the sliding door 31, and the second direction is a direction facing the opening area 32 of the sliding door 31. The composite image generation unit 12 generates the composite vehicle image 40F to represent the sliding door 31 as being moved in the vehicle width direction with a larger shift amount SD2 when the virtual viewpoint is located in the first direction than the shift amount SD1 when the virtual viewpoint is located in the second direction. In this case, it becomes easier for the occupant to recognize the degree of door opening of the sliding door 31 of the vehicle 30 in the composite vehicle image 40F displayed on the HMI 3.

Although the example of the present disclosure has been described above, the present disclosure is not limited to the above-described example. The present disclosure can be implemented in various forms with various modifications and improvements based on the knowledge of those skilled in the art, including but not limited to the above-described example.

In the above-described example, the composite vehicle image is generated basically based on the actual door opening degree detected using the door opening degree sensor 2, but the present disclosure is not limited to this example. The door opening degree sensor 2 may be a known courtesy switch that detects the opening/closing of the door of the vehicle. In this case, based on whether the courtesy switch is ON or OFF, the composite vehicle image representing the door opened with a preset door opening degree may basically be generated if the vehicle door is open, and then the additional amount of door opening degree may be added.

In the above-described example, the hinged door 21 and the sliding door 31 are shown as these examples of the doors of the vehicle, but the present disclosure is not limited to these examples. For example, the door of the vehicle may be a trunk door, a luggage room door, a hood of the bonnet, or a gull-wing door of a sports vehicle.

What is claimed is:

1. A display device comprising:
an electronic control unit (ECU); and
a plurality of cameras, wherein each of the plurality of cameras captures an image of surroundings of a vehicle, wherein the ECU is configured to:
acquire captured images using the plurality of cameras;
synthesize the captured images and generate a composite vehicle image representing the vehicle as viewed from a virtual viewpoint; and
display the composite vehicle image on an in-vehicle display unit;
wherein the ECU is configured to generate the composite vehicle image based on a direction relative to the vehicle from the virtual viewpoint to represent a door of the vehicle as being more widely opened when the virtual viewpoint is located in a predetermined first direction than when the virtual viewpoint is located in a predetermined second direction, the second direction being a direction from which an opening area of the door is more visible from the virtual viewpoint than from the first direction, such that the composite vehicle image represents the door as being opened with a larger opening degree than an actual opening degree of the door.

2. The display device according to claim 1, wherein the door of the vehicle includes a hinged door that opens by rotating around a hinge fixed to a body of the vehicle, the first direction is a direction not facing an opening area of the hinged door, the second direction is a direction facing the opening area of the hinged door, and the ECU is configured to generate the composite vehicle image to represent the hinged door as being opened with a larger rotation amount when the virtual viewpoint is located in the first direction than the rotation amount when the virtual viewpoint is located in the second direction, such that the composite vehicle image represents the hinged door as being opened with a larger rotation than an actual rotation amount of the hinged door.

3. The display device according to claim 1, wherein the door of the vehicle includes a sliding door that opens by moving in a vehicle width direction with a predetermined shift amount and moving in a longitudinal direction relative to a body of the vehicle, the first direction is a direction not facing an opening area of the sliding door, the second direction is a direction facing the opening area of the sliding door, and the ECU is configured to generate the composite vehicle image to represent the sliding door as being moved in the vehicle width direction with a larger shift amount when the virtual viewpoint is located in the first direction than the shift amount when the virtual viewpoint is located in the second direction, such that the composite vehicle image represents the sliding door being opened with a larger shift amount than an actual shift amount of the sliding door.

4. The display device according to claim 2, wherein the door of the vehicle includes a sliding door that opens by moving in a vehicle width direction with a predetermined shift amount and moving in a longitudinal direction relative to a body of the vehicle, the first direction is a direction not facing an opening area of the sliding door, the second direction is a direction facing the opening area of the sliding door, and the ECU is configured to generate the composite vehicle image to represent the sliding door as being moved in the vehicle width direction with a larger shift amount when the virtual viewpoint is located in the first direction than the shift amount when the virtual viewpoint is located in the second direction, such that the composite vehicle image represents the sliding door as being opened with a larger shift amount than an actual shift amount of the sliding door.

5. The display device according to claim 1, wherein the ECU is configured to:

calculate an additional amount of door opening degree based on the direction relative to the vehicle from the virtual viewpoint, and generate the composite vehicle image to represent the door as being opened with a door opening degree obtained by adding the additional amount of door opening degree to the actual opening degree of the door, the additional amount of door opening degree being larger when the virtual viewpoint is located in the first direction than when the virtual viewpoint is located in the second direction.

6. The display device according to claim 1, wherein an additional amount of door opening degree is smaller for viewpoints where the opening area of the door of the vehicle is more visible, and larger for viewpoints where the opening area of the door of the vehicle is less visible.

7. The display device according to claim 5, wherein the additional amount of door opening degree monotonically increases according to the direction relative to the vehicle from the viewpoint where the opening area of the door of the vehicle is most visible to the viewpoint where it is least visible.

8. The display device according to claim 1, further comprising a door opening degree sensor configured to detect the actual opening degree of the door, wherein the ECU is configured to acquire the actual door opening degree based on a detection result of the door opening degree sensor.

9. The display device according to claim 8, wherein the door opening degree sensor is a linear sensor.

10. The display device according to claim 1, further comprising a human machine interface (HMI) including the in-vehicle display unit, wherein the ECU is configured to acquire the virtual viewpoint in response to an operation by an occupant to select the virtual viewpoint performed on the HMI.

11. The display device according to claim 1, wherein the first direction is a direction directly in front of the vehicle, and the second direction is a direction diagonally behind a side of the vehicle.

12. The display device according to claim 1, wherein when the virtual viewpoint is located in the second direction, the ECU is configured to generate the composite vehicle image to represent the door opened with a door opening degree equal to the actual opening degree of the door without adding an additional amount of door opening degree.

13. The display device according to claim 1, wherein the ECU is configured to generate the composite vehicle image when the vehicle is stopped with the door open.

14. The display device according to claim 1, wherein the door of the vehicle is a trunk door, a luggage room door, a hood of a bonnet, or a gull-wing door.

15. The display device according to claim 10, wherein the HMI includes a display, a speaker, and a microphone in a vehicle interior, and the display functions as a touch panel, and the operation by the occupant to select the virtual viewpoint is a touch operation on an image corresponding to the virtual viewpoint displayed on the touch panel.

\* \* \* \* \*